United States Patent [19]
Okamoto

[11] Patent Number: 4,815,131
[45] Date of Patent: Mar. 21, 1989

[54] DIGITAL AUDIO CHANNEL SELECTION CIRCUIT

[75] Inventor: Manabu Okamoto, Saitama, Japan

[73] Assignee: Pioneer Electronic Corporation, Tokyo, Japan

[21] Appl. No.: 102,959

[22] Filed: Sep. 30, 1987

[30] Foreign Application Priority Data

Sep. 30, 1986 [JP] Japan .................................. 61-232652

[51] Int. Cl.$^4$ .............................................. H04S 1/00
[52] U.S. Cl. .......................................... 381/1; 369/87; 360/32; 370/114
[58] Field of Search ..................... 370/77, 114; 360/32; 369/87; 381/1, 7, 2, 3

[56] References Cited

U.S. PATENT DOCUMENTS 4,075,429  2/1978  Takahata et al. ..................... 370/77
4,642,812  2/1987  Yoshio et al. .......................... 369/87
4,710,826  12/1987  Sakurai ................................. 360/32

FOREIGN PATENT DOCUMENTS 0144036  7/1985  Japan ...................................... 381/3

Primary Examiner—Forester W. Isen
Attorney, Agent, or Firm—Sughrue, Mion, Zinn, Macpeak & Seas

[57] ABSTRACT

A digital audio channel selection circuit for a serial audio signal having two multiplexed channels. The digital signal is converted from digital to analog and applied to two separate sample and hold circuits. Sampling pulses for the two channels are obtained and are applied to the sample and hold circuits in different combinations dependent on how the two channels are to be output.

7 Claims, 4 Drawing Sheets

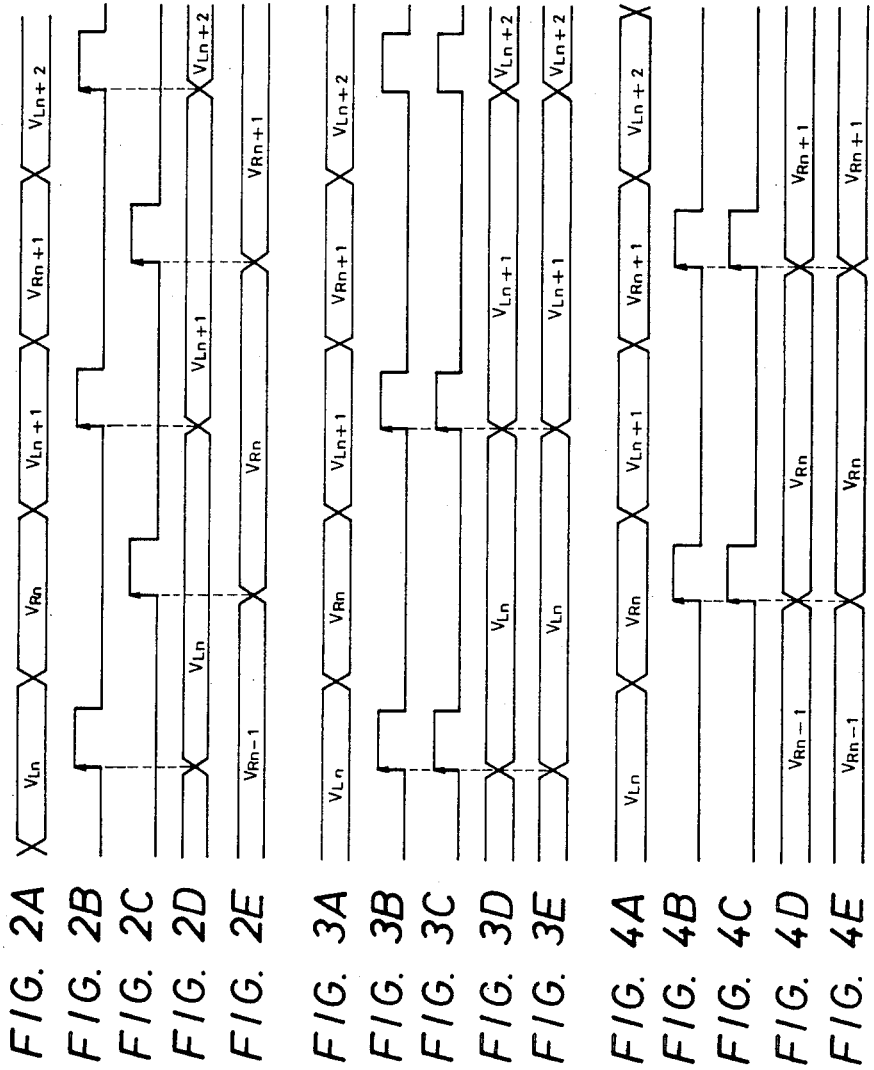

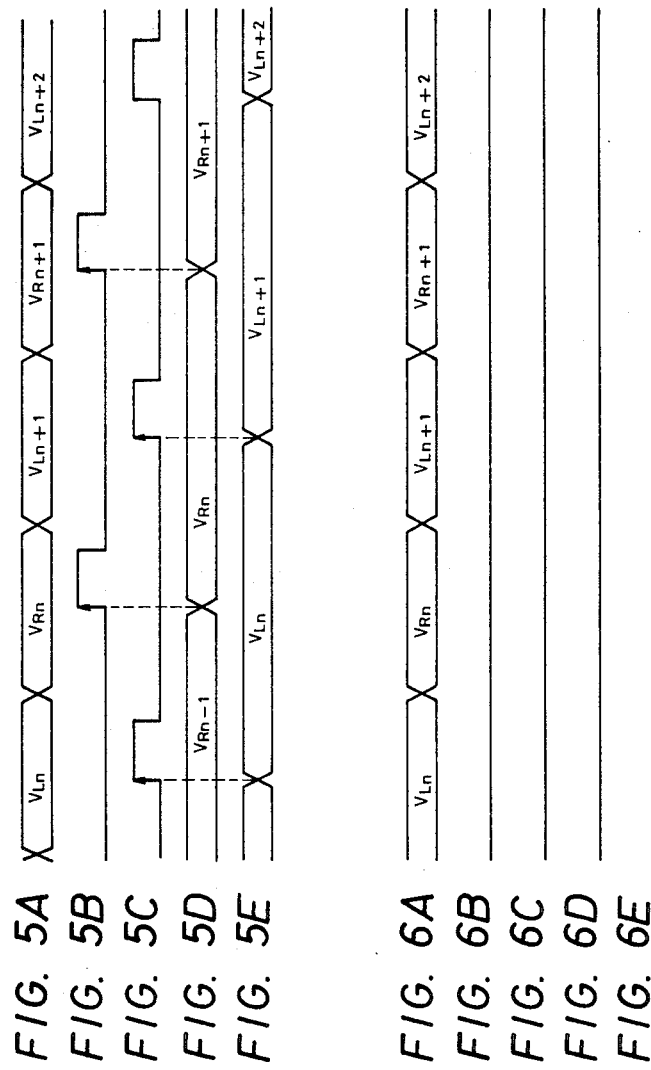

DIGITAL AUDIO CHANNEL SELECTION CIRCUIT

FIELD OF THE INVENTION

The present invention relates to a digital audio channel selection circuit.

BACKGROUND OF THE INVENTION

A general video disk carries a video signal and an audio signal which have been recorded thereon after they have been frequency-modulated (FM) independently of each other. Recently, however, a so-called video disk with digital sound has been developed and commercialized. That is, in this system, an audio signal digitized into a pulse train signal through a predetermined digital modulation system is recorded on the video disk in superposition with FM-modulated video and audio signals. Reference is made to Japanese Patent Unexamined Publication No. 59-171001. By use of such a video disk with digital sound, not only a high quality picture but hi-fi two-channel sound can be obtained.

In an apparatus for reproducing such a video disk with digital sound, generally, the demodulated digital audio outputs for a left channel (hereinafter simply referred to as L-channel) and a right channel (hereinafter simply referred to as R-channel) are respectively for Japanese and foreign language, for example, in the case of a sound multiplex system. As shown in FIG. 7, a digital output demodulated in a PCM decoder 1 is converted into an analog signal by a D/A (digital-to-analog) converter 2, and then applied to sample and hold circuits 3L and 3R provided in the L- and R-channels respectively. In the sample and hold circuits 3L and 3R, the input signals are sampled and held in respective synchronism with L- and R-channel sampling pulses generated from the PCM decoder 1 so as to be separated into analog audio signals for the L-and R-channels. The respective analog audio signals are applied through LPFs (low-pass filters) 4L and 4R and buffer amplifiers 5L and 5R respectively to mode change-over switches 6L and 6R, which are actuated independently of each other. The switches 6L and 6R are switched by L- and R-channel selection signals produced from a selection signal generating circuit 8 so as to select any one of three output modes of the respective audio signals produced at output terminals 7L and 7R of the L-and R-channels. These modes include a first output mode in which Japanese and a foreign language are produced at the output terminals 7L and 7R respectively, a second output mode in which only Japanese is produced at each of the output terminals 7L and 7R, and a third output mode in which only a foreign language is produced at each of the output terminals 7L and 7R. Reference is made to Japanese Patent Unexamined Publication No. 59-194439.

The conventional apparatus described above is arranged such that the audio signals themselves are switched by the mode change-over switches 6L and 6R, and relays or analog switches are used as those switches 6L and 6R. As a result, there has been such a disadvantage that the sound is deteriorated in quality as well as an S/N ratio as the number of contacts through which the audio signals themselves pass is increased.

Further, in the case where relays are used as the mode change-over switches 6L and 6R, not only two relays but two relay driving circuits are required so that there has been such a disadvantage that not only a large space is required so as to dispose the parts but power consumption is large.

SUMMARY OF THE INVENTION

It is therefore an object of the present invention to eliminate the disadvantages as described above in the prior art.

Specifically, it is an object of the present invention to provide a digital audio channel selection circuit in which the change-over of the output mode is carried out just after the D/A conversion so that the mode can be changed over with a small power consumption and without deteriorating the S/N ratio as well as sound quality.

According to an aspect of the present invention, the digital audio channel selection circuit is arranged such that audio serial data for two channels are converted from digital to analog form. When the D/A converted output is sampled by first and second sampling means in synchronism with a first and a second sampling pulse respectively corresponding to two channels, the first and second sampling pulses are applied to the first and second sample means respectively in a combination designated by a predetermined control signal. As a result, respective outputs of the first and second sampling means are derived as audio outputs for the two channels respectively.

BRIEF DESCRIPTION OF THE DRAWINGS

FIGS. 2A through 2E are timing charts in a stereophonic output mode.

FIGS. 3A through 3E are timing charts in an L-channel selection mode.

FIGS. 4A through 4E are timing charts in an R-channel selection mode.

FIGS. 5A through 5E are timing charts in an L/R reversed-phase output mode.

FIGS. 6A through 6E are timing charts when the digital audio channel selection circuit is used as a muting circuit.

DETAILED DESCRIPTION OF THE PREFERRED EMBODIMENT

Figure 1:
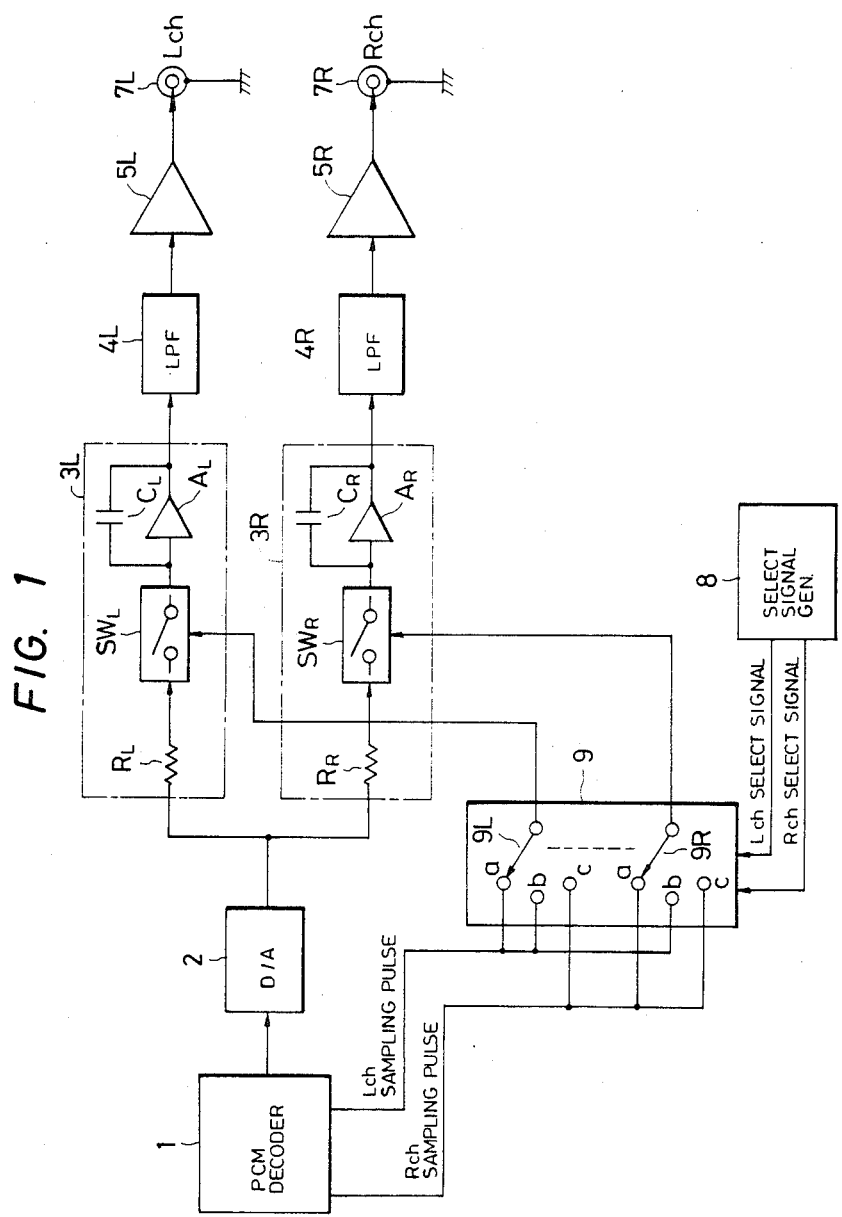
FIG. 1 is a block diagram showing an embodiment of the digital audio channel selection circuit according to the present invention.

Referring to the drawings, an embodiment of the present invention will be described hereunder.

Figure 7:
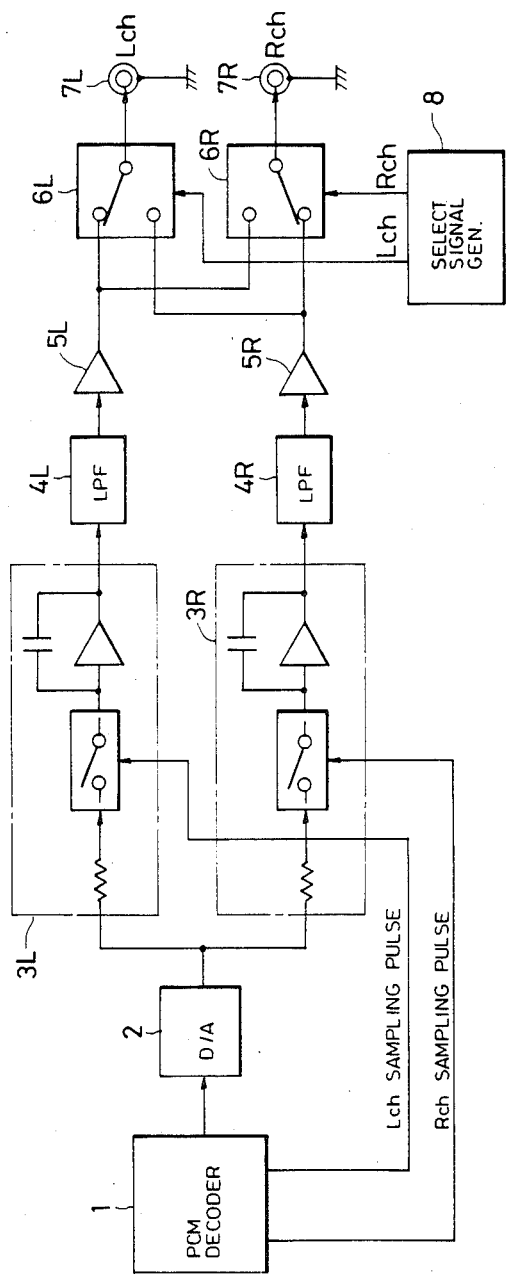
FIG. 7 is a block diagram showing an example of th prior art.

FIG. 1 is a block diagram showing an embodiment of the present invention, in which the same parts as those in FIG. 7 are correspondingly referenced. An RF (high frequency) signal read out from a recording medium (not shown) is demodulated in a PCM decoder 1 and produced as left and right (hereinafter simply referred to L and R) serial data. The L and R serial data is converted into an analog signal by a D/A converter 2. Analog voltages $V_L$ and $V_R$ for the two, L-and R-channels are produced from the D/A converter 2 in time-division and supplied to sample and hold circuits 3L and 3R respectively. The sample and hold circuit 3L is constituted by a resistor $R_L$, an analog switch $SW_L$, a holding capacitor $C_L$, and a buffer amplifier $A_L$. The sample hold circuit 3L is constituted similarly to the sample hold circuit 3L. Respective held outputs of the sample and hold circuits 3L and 3R are applied to output terminals 7L and 7R through LPFs 4L and 4R and buffer amplifiers 5L and 5R so as to be audio outputs of the L- and R-channels respectively.

L- and R-channel sampling pulses are produced from the PCM decoder 1 in synchronism with output wave forms of analog voltages $V_L$ and $V_R$ produced from the D/A converter 2, and are applied to a multiplexer 9. The multiplexer 9 is constituted, for example, by two switches 9L and 9R which are interlocked with each other and each of which is provided with three inputs and one input. As a result, the multiplexer 9 applies the L- and R-channel sampling pulses to the sample and hold circuits 3L and 3R in a combination designated by the L- and R-channel selection signals (predetermined control signals) produced from a select signal generating circuit 8.

That is, in the multiplexer 9, the L-channel sampling pulse is applied to the input terminals a and b of the switch 9L as well as to the input terminal b of the switch 9R, while the R-channel sampling pulse is applied to the input terminals a and c of the switch 9R as well as to the input terminal c of the switch 9L. For example, in a stereophonic output mode, the L- and R-channel selection signals are made to be in a low level (hereinafter simply referred to "L") at the same time, so that the respective switches 9L and 9R select their input terminals a so as to pass the L-channel and R-channel sampling pulses through the respective input terminals a. In an L-channel selection mode, the L-channel selection signal is made "L" while the R-channel selection signal is made to be in a high level) hereinafter simply referred to "H") so that the respective switches 9L and 9R select their input terminals b so as to pass only the L-channel sampling pulse through the respective input terminals b. In an R-channel selection mode, the L-channel selection signal is made "H" while the R-channel selection signal is made "L" so that the respective switches 9L and 9R select their input terminals c so as to produce only the R-channel sampling pulse through the respective input terminals c.

Although FIG. 1 shows two three-pole switches 9L and 9R which are interlocked, the preceding description applies to two two-pole switches separately controlled by the two channel selection signals.

Thus, in the stereophonic output mode, the analog voltages $V_L$ and $V_R$ for the two channels are separated from each other by the sample and hold circuits 3L and 3R so as to be audio outputs for the L- and R-channels respectively. In the L-channel selection mode, both the sample and hold circuits 3L and 3R perform sampling and holding in synchronism with the L-channel sampling pulse so that only the analog voltage $V_L$ is made to be an audio output for both the channels. In the R-channel selection mode, both the sample and hold circuits 3L and 3R perform sampling and holding in synchronism with the R-channel sampling pulse so that only the analog voltage $V_R$ is made to be an audio output for both the channels.

FIGS. 2A through 4E show timing charts of the three modes described above respectively, in which FIGS. 2A–2E are the timing charts in the stereophonic output mode, FIGS. 3A–3E are the timing charts in the L-channel selection mode, and FIGS. 4A–4E are the timing charts in the R-channel selection mode. In each of the drawings, (A), (B), (C), (D) and (E) show the output of the D/A converter 2, the L-channel sampling pulse, the R-channel sampling pulse, the L-channel audio output, and the R-channel audio output, respectively.

Thus, for example in the case where a demodulated digital audio output is of a voice multiplex system, the output mode of voices produced from the output terminals 7L and 7R (three modes including a first mode of Japanese and a foreign language, a second mode of only Japanese, and a third mode of only a foreign language) is changed over just after D/A conversion. As a result, the sound quality is never deleteriously influenced so that an audio signal can be reproduced with high sound quality and with an improved S/N ratio.

In the embodiment described above, the case has been described in which the multiplexer 9 is constituted by the switches 9L and 9R each having three inputs and one output so as to have three mode change-over stages. However, it is possible to modify the arrangement such that the multiplexer 9 is constituted by two switches 9L and 9R each having, for example, four inputs and one output. Then R- and L-channel sampling pulses are applied to the additionally provided input terminals of the switches 9L and 9R respectively so as to make it possible to produce reversed-phase outputs of the L- and R-channels by properly selecting those input terminals. Figures 5A through 5E show the timing chart in this case. Alternatively, the respective additionally provided input terminals of the switches 9L and 9R may be grounded so that the circuit may be used as a muting circuit. FIGS. 6A through 6E show the timing chart in this case.

In the embodiment, although the sample and hold circuit is used as the sampling means, the sample and hold circuit is not limited to this, but may employ, for example, a deglitcher circuit for removing mustache-like noise called glitch which is generated when an analog switch is switched.

As described above, according to the present invention, the output mode is changed over just after D/A conversion, so that the mode change-over can be performed without providing any relay or any analog switch, which may badly influence sound quality or the like, in an audio signal line. Accordingly, an audio signal can be reproduced with high sound quality and with an improved S/N ratio.

Further, because a multiplexer which can be constituted by an IC (integrated circuit) is used instead of the relays or analog switches for two channels, according to the present invention, provision of only one IC may suffice for the invention and, therefore, it is possible to reduce electric power consumption as well as space.

What is claimed is:

1. A digital audio channel selection circuit, comprising:
   a D/A (digital-to-analog) converter for digital-to-analog converting audio serial data for two channels;
   first and second sampling means for sampling an output signal of said D/A converter in synchronism with a first and a second sampling pulse respectively corresponding to said two channels; and
   means for applying said first and second sampling pulses in any of a plurality of combinations designated by a predetermined control signal to said first and second sampling means respectively, whereby respective outputs of said first and second sampling means are derived as audio outputs for said two channels respectively.

2. A digital audio channel selection circuit as recited in claim 1, wherein said applying means selectively applies to said first and second sampling means any one of (1) said first sampling pulse to said first sampling means and said second sampling pulse to said second sampling means, (2) said first sampling pulse to both of said first and second sampling means, and (3) said second sampling pulse to both of said first and second sampling means.

3. A digital audio channel selection circuit as recited in claim 2, wherein said applying means additionally selectively applies said first sampling pulse to said second sampling means and said second sampling pulse to said first sampling means.

4. A digital audio channel selection circuit as recited in claim 2, wherein said applying means additionally selectively applies a blocking signal to said first and second sampling means.

5. A digital audio channel selection circuit as recited in claim 1, further comprising a PCM decoder receiving a digitized, FM-modulated signal and providing said audio serial data for said two channels and said first and second sampling pulses and wherein said applying means comprises switching means for said first and second sampling pulses.

6. A digital audio channel selection circuit, comprising:
   a D/A (digital-to-analog) converter for converting serial audio data for two channels;
   first and second sample and hold circuits for sampling and holding an output signal of said D/A converter and having respective first and second holding controllers;
   means for obtaining first and second sampling pulses for said two channels respectively; and
   means for applying said first and second sampling pulses to selected combinations of said first and second holding controllers.

7. A method of selecting audio channels, comprising the steps of:
   converting a serial audio signal having two channels from digital to analog form;
   a first step of sampling and holding said converted audio signal;
   a second step of sampling and holding said converted audio signal;
   selecting one of a plurality of modes including a first mode for holding a signal for said first channel but not for said second channel, a second mode for holding a signal for said second channel but not for said first channel, and a third mode for holding signals for both said first and second channels;
   obtaining a timing of said two channels; and
   controlling independently said first and second steps of sampling and holding dependent upon said timing and upon said selected mode.

* * * * *